United States Patent
Trikha

(10) Patent No.: US 10,427,212 B2
(45) Date of Patent: Oct. 1, 2019

(54) COMPOSITIONS AND METHODS FOR MODIFIED ESTER-CURATIVES AND REDUCTION OF FORMALDEHYDE EMISSION AND ODOR IN ESTER-CURED PHENOLIC BINDER SYSTEMS

(71) Applicant: HA-International, LLC, Westmont, IL (US)

(72) Inventor: Sudhir K. Trikha, Naperville, IL (US)

(73) Assignee: HA-International, LLC, Westmont, IL (US)

( * ) Notice: Subject to any disclaimer, the term of this patent is extended or adjusted under 35 U.S.C. 154(b) by 0 days.

(21) Appl. No.: 16/367,939

(22) Filed: Mar. 28, 2019

(65) Prior Publication Data

US 2019/0224744 A1 Jul. 25, 2019

Related U.S. Application Data

(63) Continuation of application No. 16/273,369, filed on Feb. 12, 2019, which is a continuation of application No. 15/182,352, filed on Jun. 14, 2016, now abandoned, which is a continuation-in-part of application No. 14/975,471, filed on Dec. 18, 2015, now abandoned.

(51) Int. Cl.
*B22C 1/22* (2006.01)
*C08K 5/13* (2006.01)
*C08L 61/06* (2006.01)

(52) U.S. Cl.
CPC .............. *B22C 1/2253* (2013.01); *C08K 5/13* (2013.01); *C08L 61/06* (2013.01)

(58) Field of Classification Search
CPC ........... C08G 8/10; B22C 1/2253; B22C 1/22; C08L 61/06
USPC ........................................................ 523/145
See application file for complete search history.

(56) References Cited

U.S. PATENT DOCUMENTS

| | | | |
|---|---|---|---|
| 3,642,503 A | 2/1972 | Beaney | |
| 3,917,558 A * | 11/1975 | Gardikes | B22C 1/2233 523/144 |
| 4,862,948 A | 9/1989 | Laitar | |
| 4,994,505 A | 2/1991 | Gerber | |
| 5,089,540 A | 2/1992 | Armbruster et al. | |
| 5,354,788 A | 10/1994 | Johnson et al. | |
| 6,232,368 B1 * | 5/2001 | White | B22C 1/2253 164/527 |
| 6,559,203 B2 | 5/2003 | Hutchings et al. | |
| 2003/0096922 A1 | 5/2003 | Tutin et al. | |
| 2005/0250872 A1 | 11/2005 | Fox et al. | |
| 2006/0094853 A1 | 5/2006 | Arbuckle | |
| 2010/0252226 A1 | 10/2010 | Bangcuyo et al. | |
| 2012/0043694 A1 * | 2/2012 | Kagitani | B22C 1/2253 264/219 |

FOREIGN PATENT DOCUMENTS

| | | |
|---|---|---|
| CN | 101530624 | 9/2009 |
| CN | 104190856 | 12/2014 |
| JP | H1133670 | 2/1999 |
| JP | 2007231218 | 9/2007 |
| WO | 95/19235 | 7/1995 |
| WO | 1999/030855 | 6/1999 |
| WO | 2000/050186 | 8/2000 |

OTHER PUBLICATIONS

Saima Saleem, A method of chemical aftertreatment for the reduction of free formaldehyde release of a durable flame retardant finished cotton fabric, Thesis for the Degree of Master in Science With a major in Textile Engineering The Swedish School of Textiles; Jun. 5, 2015, Report No. Jan. 14, 2015.

V.C. Resmi, S.K. Narayanankutty, Synthesis and Modification of Low-Formaldehyde Resol Resin using Sodium Sulphite and Hydroxylammine Hydrochloride, http://www.ijacskros.com/artcles/IJACS-MSP73.pdf, 2014, pp. 19-23, vol. 2.

International Search Report which issued in connection with PCT/US16/37033 dated Sep. 1, 2016.

International Search Report which issued in connection with PCT/US16/12199 dated Mar. 16, 2016.

* cited by examiner

*Primary Examiner* — Doris L Lee

(74) *Attorney, Agent, or Firm* — Adam J. Fromm; Clark Hill PLC

(57) ABSTRACT

This invention relates to compositions and methods for reduction of formaldehyde odor and emission during the production and curing of cores and molds, particularly those cores and molds of the foundry industry which comprise ester curable phenolic binders. More specifically, included herein is an ester-curative comprising an ester and resorcinol which, when provided in a composition with a resin and an aggregate, effectively scavenges unreacted formaldehyde thereby reducing emission and odor of the same from the composition.

20 Claims, No Drawings

COMPOSITIONS AND METHODS FOR MODIFIED ESTER-CURATIVES AND REDUCTION OF FORMALDEHYDE EMISSION AND ODOR IN ESTER-CURED PHENOLIC BINDER SYSTEMS

CROSS REFERENCE TO RELATED APPLICATIONS

This application is a continuation of U.S. patent application Ser. No. 16/273,369 filed on Feb. 12, 2019, which is a continuation of U.S. patent application Ser. No. 15/182,352 filed on Jun. 14, 2016, which is a continuation-in-part of U.S. patent application Ser. No. 14/975,471 filed on Dec. 18, 2015.

FIELD OF THE INVENTION

This invention relates to no-bake cores and molds used in the foundry industry. More specifically, this invention relates to modified ester-curatives and methods for reduction of formaldehyde odor and emission during the production of cores and molds comprising ester curable phenolic binders.

BACKGROUND OF THE INVENTION

In foundry art, cores and molds for making metal castings are normally prepared from a mixture of an aggregate material, such as sand, and a binding amount of a binder or binder system. Typically, after the aggregate material and binder have been mixed, the resulting mixture is rammed, blown, or otherwise formed to the desired shape or pattern of the core or mold, and then cured to a solid using a catalyst, a co-reactant, and/or heat.

One group of processes which do not require heating in order to achieve curing of the cores and molds are referred to as no-bake processes. In such processes, the binder components are coated on an aggregate material during a mixing step, and then formed around the cope and drag halves of a mold. The binder components cure after a finite period of time, thus hardening the aggregate mixture in preparation for pouring of metals during casting. The elimination of the heating step has, historically, resulted in a reduction of costs in no-bake processes as compared to earlier technologies.

Several types of no-bake binders are known. Furan no-bake (FNB) binders were introduced as early as the 1950s. Furan binders are generally regarded as the first genuine no-bake binders, and they are generally easy to control and have excellent strength. However, FNBs must contend with significant raw material price swings, production limitations, and the disagreeable smell of sulfur dioxide emissions during the casting process. Phenolic-urethane no-bake (PUNB) binders have been around since the 1970s, and these binders enhanced the ease of mold (aggregate) reclamation and use of no-bake binder systems in high speed production of metal castings. However, a primary drawback of PUNBs is the comparatively high levels of odor and smoke at molding and casting due to the presence of solvents comprising volatile organic compounds. Organic ester-cured alkaline phenolic no-bake binders, meanwhile, were introduced in the early 1980s. These binder systems employ water soluble resins that have comparatively lower levels of odor emission and toxicity during molding and casting, resulting in better working conditions and increased foundry productivity.

Commonly used resins in ester-cured alkaline phenolic no-bake binder systems include phenol-formaldehyde polymer. As a result, despite the comparatively lower odor production of these systems, free formaldehyde is emitted during the molding and core making processes that use this system. As a gas, formaldehyde has a pungent, offensive odor. The Occupational Safety & Health Administration (OSHA) has established permissible exposure limits for the substance. Additionally, formaldehyde can cause irritation and burning of the eyes and nose of people exposed to it, such foundry workers. Thus, adequate control or elimination of formaldehyde emission during the use of ester-cured alkaline phenolic no-bake binder systems is desirable.

United States Patent Publication Number 2005/0250872 to Fox et al. teaches a process comprising adding a mixture of an aqueous alkaline phenolic resole resin and a liquid organic ester for the purpose of immobilizing large swaths of an aggregate, such as sand in a desert. Fox et al. further discloses that urea may be added to the resin as a scavenger that reacts with unreacted formaldehyde to allegedly remove odor caused by the same.

U.S. Pat. No. 6,559,203 to Hutchings et al., teaches a combination of furan binders and resorcinol in foundry molds. Hutchings et al. further teaches a combination of ester cured phenolic resole resin binders and resorcinol to demonstrate general improvement in long-term tensile strengths and humidity resistance of foundry cores made with the aforementioned binders.

It is notable that urea has been used in the prior art to reduce formaldehyde emissions. However, it can only be added in limited amounts, as it is a source of nitrogen so the level needs to be controlled in steel castings to avoid nitrogen related defects. Accordingly, the amounts of urea currently used are not adequate to effectively reduce formaldehyde.

The prior art fails to address the longstanding unmet need in the foundry industry for ester-cured alkaline phenolic no-bake binder systems that will not only help foundries comply with OSHA standards for worker safety and health, but also improve the working environment around the systems by reducing the offensive odors and toxicity associated with intolerable formaldehyde emission levels.

Accordingly, it would be advantageous to provide an ester-cured alkaline phenolic no-bake composition that reduces formaldehyde odor and emissions as compared to conventional ester-cured alkaline phenolic no-bake technologies, without sacrificing performance (i.e., tensile strength) in the associated molds and cores or imparting nitrogen related defects in steel castings, as described herein.

SUMMARY OF THE INVENTION

Unexpectedly, in view of the foregoing challenges, it has been found that ester-cured alkaline phenolic no-bake binder systems having liquid ester components that are modified with concentrations of resorcinol exhibit improved reduction of formaldehyde emissions without sacrificing performance in foundry molds and cores that employ this technology. Reductions in formaldehyde are achieved due to the modification of the liquid ester with resorcinol, which functions as a scavenger by reacting with formaldehyde during curing of the molds and cores.

In one preferred embodiment, a new modified ester-curative is provided, the modified ester-curative comprising an ester and resorcinol. More specifically, there is provided a modified ester-curative composition comprising: (a) an ester-curative; and (b) resorcinol; wherein the ester-curative is selected from the group consisting of: (i) an ester-curative comprising about 20% to about 30% glycerol triacetate by weight of the ester-curative, (ii) an ester-curative comprising about 90% to about 100% glycerol triacetate by weight of the ester-curative, and (iii) an ester-curative comprising about 30% propylene carbonate by weight of the ester-curative and about 70% gamma butyrolactone by weight of the ester-curative; and wherein a ratio of (a) to (b) ranges from about 19:1 to about 99:1 by weight of the modified ester-curative.

In an alternative preferred embodiment, a new ester-cured alkaline phenolic no-bake composition comprising an alkaline phenolic resole resin having a pH of at least 13 and a modified ester-curative comprising an ester and resorcinol is provided. More specifically, there is provided a composition comprising: a mixture comprised of an aggregate and an alkaline phenolic resole resin, the mixture combined with; a modified ester-curative comprised of (a) an ester-curative and (b) resorcinol; wherein a ratio of (a) to (b) ranges from about 19:1 to about 99:1 by weight of the modified ester-curative; and wherein the modified ester-curative is configured to effect reduced emission of formaldehyde from the composition.

In yet another alternative preferred embodiment, a new method for forming foundry molds and cores having very low formaldehyde emissions and excellent tensile strength characteristics is provided. More specifically, in this embodiment the method comprises the steps of: (a) combining an aggregate with an alkaline phenolic resole resin to form a first admixture; (b) combining an ester-curative with resorcinol to form a modified ester-curative; (c) combining the first admixture with the modified ester-curative to form a second admixture; (d) placing the second admixture in a housing; and (e) allowing the second admixture to cure; wherein the ratio of ester-curative to the resorcinol ranges from about 19:1 to about 99:1 by weight of the modified ester-curative; and wherein the modified ester-curative is configured to effect reduced emission of formaldehyde from the second admixture.

An objective of the present invention is to provide a new and improved ester-cured alkaline phenolic no-bake binder composition that reduces formaldehyde emission during the curing process of foundry molds and cores, without sacrificing performance of the same.

A major advantage of the present invention is that it provides molds and cores having significantly lower emissions of formaldehyde during the curing process than was heretofore obtainable with conventional ester-cured alkaline phenolic no-bake binder compositions and methods.

Another major advantage of the present invention is that it provides molds and cores having the combined benefit of significantly lower emissions of formaldehyde during the curing process coupled with commercially suitable tensile strength in the molds and cores than was heretofore obtainable with conventional ester-cured alkaline phenolic no-bake binder compositions and methods.

BRIEF DESCRIPTION OF THE DRAWINGS

Not applicable.

DETAILED DESCRIPTION OF THE EMBODIMENTS

While the invention may be susceptible to embodiment in different forms, there is described herein in detail, specific preferred embodiments with the understanding that the present disclosure is to be considered an exemplification of the principles of the invention, and is not intended to limit the invention to that described herein.

In one preferred embodiment of the present invention, a composition is formed of a binder, an aggregate, an ester-curative, and resorcinol.

One preferred binder of the present invention is ALpHA-SET 9040 alkaline phenolic resole resin, made and sold by HA International LLC, Westmont, Ill. This resin is comprised of about 5% by weight to about 10% by weight sodium hydroxide, about 1% by weight to about 3% by weight of urea, and less than about 0.3% by weight, formaldehyde. It has a viscosity of about 100 cPs, a solids content of about 47%, a specific gravity of about 1.23, a pH of about 13.0, a free phenol content of about 0.5%, a free formaldehyde content of about 0.25%, and a nitrogen content of less than about 1%. It is ester-curable, preferably using a liquid ester. ALpHASET 9040 derives its alkalinity predominantly from sodium hydroxide and thus it may be described as a sodium-based resin. It is contemplated, however, that other embodiments may include other alkaline phenolic resole resins, such as a potassium based alkaline resin or a hybrid of sodium and potassium alkaline resins, as will be appreciated by those ordinary skill in the art.

One preferred aggregate of the present invention is clean, round grain, 55 grain fineness number (GFN) silica sand. The aggregate materials commonly used in the foundry industry include silica sand, construction aggregate, quartz, chromite sand, zircon sand, olivine sand, or the like. Reclaimed sand, that is sand that may have been previously bonded with an ester cured alkaline phenolic resin binder, or other binder system, may also be used. Sand sold under the product designation F-5574, available from Badger Mining Corporation, Berlin, Wis., is useful in making cores and molds and in testing the embodiments of the present invention. Likewise, sand sold under the product designation Wedron 530, available from Wedron Silica, a division of Fairmount Minerals, Wedron, Ill., is also useful. Sand sold under the product designation Nugent 480, available from Nugent Sand Company, Muskegon, Mich., may also be used. Where alkaline resoles are used in the compositions and methods of the present invention, the sand type will affect the strength development of the bound aggregate.

A preferred ester-curative, also referred to as a co-reactant, of the present invention accelerates the hardening of the resole resin and may be introduced to the resole resin as a liquid. It is contemplated that the esters used in preparing the ester-curative compositions of this invention may be any of the esters commonly used to cure alkaline phenolic resole resins. Such esters include gamma-butyrolactone, triacetin, ethylene glycol diacetate, propyleneglycol diacetate, propylene carbonate, dimethyl succinate, dimethyl adipate, dimethyl glutarate, glycerol mono- and diacetates and the like. Mixtures of these ester-curatives may also be used. It is further contemplated that other esters, such as those described in U.S. Pat. Nos. 4,988,745 and 5,036,116 may be used as well, and those patents are herein incorporated by reference in their entirety.

One preferred ester-curative of the present invention is ALpHACURE 920, made and sold by HA International LLC, Westmont, Ill. This ester-curative is comprised of about 90% by weight to about 100% by weight of glycerol triacetate, which is also known as triacetin. This ester-curative has a relative density of about 1.154 g/cm$^3$, a solubility in water of about 6.1%, and it has a specific gravity of about 1.1. Further, this ester-curative contains no dibasic ester (DBE). It is contemplated, however, that other embodiments may include other ester-curatives, as will be appreciated by those ordinary skill in the art.

Another preferred ester-curative of the present invention is ALpHACURE 955N, made and sold by HA International LLC, Westmont, Ill. This ester-curative is comprised of about 20% by weight to about 30% by weight of glycerol triacetate, and about 70% by weight to about 80% by weight of dibasic ester. This ester-curative has a relative density of about 1.107 g/cm$^3$ and a dynamic viscosity of about 5 cPs. The preferred dibasic ester component of this ester-curative is comprised of about 10% by weight to about 25% by weight of dimethyl adipate, about 15% by weight to about 25% by weight of dimethyl succinate, and about 55% by weight to about 65% by weight of dimethyl glutarate. The greater proportion of dibasic ester in ALpHACURE 955N as compared to that in ALpHACURE 920 results in slower strip times, as indicated below in Table 2B.

Yet another preferred ester-curative of the present invention is a blended combination of gamma butyrolactone and propylene carbonate. This ester-curative is comprised of about 70% by weight of gamma butyrolactone and about 30% by weight of propylene carbonate. Gamma butyrolactone has a molecular weight of about 86 g/mol, a pH of about 4, and a relative density of about 1.12 g/cm$^3$. Propylene carbonate has a molecular weight of about 102.09 g/mol, a specific gravity of about 1.205 and a relative density of about 1.21 g/cm$^3$.

Resorcinol is comprised of about 99.7% by weight of resorcinol, about 0.2% by weight of moisture, and about 0.1% by weight of phenol. Resorcinol itself is a benzenediol having a molecular weight of about 110.1 g/mol and a relative density of about 1.28 g/cm$^3$. In preferred embodiments of the present invention, it has been found that a modification with resorcinol of the ester-curative component of the ester-cured alkaline phenolic no-bake binder systems described herein results in an unexpected and desirable reduction in formaldehyde emission and odor from the molds and cores, without sacrificing tensile strength of the same.

A stoichiometric amount of ester is essential to co-react with the resin. The use of high and low levels of ester can lead to casting defects. While the level of resorcinol in the ester results in formaldehyde reduction, too much will detract from the curing speed of the molds and core, and/or require higher ester levels to maintain stoichiometry. 1 to 5% by weight of resorcinol in the modified ester is the preferred amount. Additionally, preferred embodiments of the present invention which include pure resorcinol, as opposed to resorcinol pitch, are advantageous because pure resorcinol is more potent than resorcinol pitch with respect to reactivity with unreacted formaldehyde. Therefore, less resorcinol by weight may be used in the preferred embodiments of the present invention as compared to greater amounts of resorcinol pitch that would otherwise be required to achieve the formaldehyde emission reductions and strip times provided by the systems and methods of the present invention. Moreover, whereas the odor of pure resorcinol is faint, the odor of resorcinol pitch is strong, such that the use of resorcinol pitch would be inapposite to one of the underlying purposes of the present invention which is to reduce the exposure of individuals to offensive odors during the manufacture of foundry binder systems.

Methodology

Generally, when an admixture is to be cured according to a no-bake process, the ester-curative is added in liquid form to the aggregate material with the phenolic resole resin component. The admixture is then shaped and simply permitted to cure until reaction between the components is substantially complete, thus forming a shaped product such as a foundry core or mold. It is contemplated, however, that other admixing methods may be used, as will be appreciated by those ordinary skill in the art. Moreover, it is contemplated that admixtures of the present invention may be allowed to cure in any housing suitable for use with ester-cured phenolic binder systems, including pattern molds and core boxes.

Consequently, by so proceeding with an admixture of foundry sand and a binding amount of the phenolic resole resin, including resorcinol components in the ester-curative, there is formed a foundry core or mold comprising foundry sand and a binding amount of a binder composition comprising the reaction product of the phenolic resole resin, the resorcinol component, and the ester-curative. Ester-curatives combined with resorcinol as recited herein are referred to as modified ester-curatives.

As further described herein, ALpHASET 9040 was tested in conjunction with various resorcinol modified esters. The formaldehyde measurements were made in each instance using EPA method 316, which is incorporated by reference herein in its entirety. Sand tests were also performed to show any effect on tensile strength. Unless otherwise indicated, all test samples of the present invention to be analyzed for formaldehyde emission were prepared using the following process.

Formaldehyde Collection and Analysis

All samples were prepared using a Hobart Kitchen Aid Mixer. 3000 g of the 55 GFN sand was weighed in a mixing bowl. 1.5% (45 grams) by weight based on sand (BOS) of ALpHASET 9040 was weighed, added to the sand, and mixed for 60 seconds. 25% (11.25 grams) of modified ester-curative by weight based on binder (BOB) was added to the coated sand and mixed for an additional 40 seconds. At the end of mixing, the coated sand sample was immediately placed in a test box and tamped down. The test box was then closed with a lid and formaldehyde was drawn into samples from the box for 20 minutes. The samples were then analyzed by an outside lab for formaldehyde using the analytical procedures of EPA Method 316.

Tensile Strength Test

Unless otherwise indicated, all foundry cores of the present invention to be analyzed for tensile strength were prepared using the following process. HA International's standard sand tensile strength test procedure was used. 3000 g of the 55 GFN sand was weighed in a mixing bowl. 1.5% (45 grams) by weight BOS of ALpHASET 9040 was added to the sand and mixed for 60 seconds. 25% of modified ester-curative (11.25 grams) by weight BOB was added to the coated sand and mixed for a further 40 seconds. The mixed sand was packed into a Dietert 696 core box, which is standard tooling for making cores. Part of the mixed sand was lightly packed into a cup, and a tongue depressor was placed in the top of the mixed sand to check for strip time. When the tongue depressor was hard to push down, it was near strip time. Once 15-18 pounds per square inch (psi) of mold surface strength when subjected to the force of a spring loaded penetrometer was achieved, the cores were removed from the core box. (The length of time between the mixing of all core components, i.e., after addition of the ester-curative, and achievement of the aforementioned core surface strength sufficient to allow the cores to be removed from the core box is the strip time.) The strip time was recorded and the test cores were broken at various time intervals after the cores was made. The cores were stored in an open laboratory environment, at ambient temperatures, until tested. Tensile strength measurements were made as described below. Average values for 3 to 4 tensile strength measurements were recorded.

Tensile strengths of the cores prepared as noted above were determined using a Thwing-Albert Tensile Tester (Philadelphia, Pa.). This device consists of jaws that accommodate the ends of a "dog-bone-shaped" test core. A load is then applied to each end of the test core as the jaws are moved away from each other. The application of an increasing load continues until the test core breaks. The load at this point is termed the tensile strength, and it has units of psi.

EXAMPLES

Example 1: Effect of Adding Resorcinol to ALpHACURE 920 in an Ester-Cured Alkaline Phenolic No-Bake Binder Composition In this example, 1%, 3%, and 5% (by weight) of resorcinol was dissolved in 99%, 97%, and 95% (by weight) of ALpHACURE 920, respectively. Samples and cores were made, as described above. The formaldehyde emissions measurements were made using EPA Method 316 and the results of the measurements are provided in Table 1A below.

TABLE 1A

Reduction of Formaldehyde Emission in Ester-Cured Alkaline Phenolic No-Bake Binder Composition Combining ALpHACURE 920 and Resorcinol

| Sample Number | Modified Ester-Curative Composition, wt % | Formaldehyde Emitted, ppm | Reduction, % |
| --- | --- | --- | --- |
| Control Sample | 100% ALpHACURE 920 | 1.302 | n/a |
| Test Sample 1 | 99% ALpHACURE 920 + 1% Resorcinol | 0.945 | 27.4 |
| Test Sample 2 | 97% ALpHACURE 920 + 3% Resorcinol | 0.603 | 53.7 |
| Test Sample 3 | 95% ALpHACURE 920 + 5% Resorcinol | 0.298 | 77.1 |

As the results of Table 1A illustrate, the use of the modified ester-curative composition of the present invention in ester-cured alkaline phenolic no-bake binder systems results in unexpected and compelling reductions in formaldehyde emissions from the systems, namely foundry molds and cores.

Additionally, the tensile strength of cores formed under Example 1 were tested using a Thwing-Albert Tensile Tester, as described above. The results of the tests are provided in Table 1B below.

TABLE 1B

Sustained Tensile Strength of Ester-Cured Alkaline Phenolic No-Bake Binder Composition Having Reduced of Formaldehyde Emission and Combining ALpHACURE 920 and Resorcinol

| Core Number | Modified Ester-Curative Composition, wt % | "Intermediate" Strip Time, minutes | Tensile Strength at 1 Hour, psi | Tensile Strength at 2 Hours, psi | Tensile Strength at 24 Hours, psi |
| --- | --- | --- | --- | --- | --- |
| Control Core | 100% ALpHACURE 920 | 16.5 | 67 | 74 | 139 |
| Test Core 1 | 99% ALpHACURE 920 + 1% Resorcinol | 17.6 | 62 | 82 | 122 |
| Test Core 2 | 97% ALpHACURE 920 + 3% Resorcinol | 18.8 | 61 | 85 | 134 |
| Test Core 3 | 95% ALpHACURE 920 + 5% Resorcinol | 19.3 | 62 | 83 | 145 |

As the results of Table 1B illustrate, the use of the modified ester-curative composition of the present invention in ester-cured alkaline phenolic no-bake binder systems has a limited effect on intermediate strip times and no significant effect on tensile strength of the systems, including foundry molds and cores.

Example 2: Effect of Adding Resorcinol to ALpHACURE 955N in an Ester-Cured Alkaline Phenolic No-Bake Binder Composition In this example, 5% (by weight) of resorcinol was dissolved in 95% (by weight) of ALpHACURE 955N. Samples and cores were made, as described above. The formaldehyde emissions measurements were made using EPA Method 316 and the results of the measurements are provided in Table 2A below.

TABLE 2A

Reduction of Formaldehyde Emission in Ester-Cured Alkaline Phenolic No-Bake Binder Composition Combining ALpHACURE 955N and Resorcinol

| Sample Number | Modified Ester-Curative Composition, wt % | Formaldehyde Emitted, ppm | Reduction, % |
| --- | --- | --- | --- |
| Control Sample | 100% ALpHACURE 955N | 0.527 | n/a |
| Test Sample 1 | 95% ALpHACURE 955N + 5% Resorcinol | 0.055 | 89.6 |

As the results of Table 2A illustrate, the use of the modified ester-curative composition of the present invention in ester-cured alkaline phenolic no-bake binder systems results in unexpected and compelling reductions in formaldehyde emissions from the systems, including the foundry molds and cores.

Additionally, the tensile strength of cores formed under Example 2 were tested using a Thwing-Albert Tensile Tester, as described above. The results of the tests are provided in Table 2B below.

TABLE 2B

Sustained Tensile Strength of Ester-Cured Alkaline Phenolic No-Bake Binder Composition Haying Reduced of Formaldehyde Emission and Combining ALpHACURE 955N and Resorcinol

| Core Number | Modified Ester-Curative Composition, wt % | "Slow" Strip Time, minutes | Tensile Strength at 2 Hours, psi | Tensile Strength at 4 Hours, psi | Tensile Strength at 72 Hours, psi |
|---|---|---|---|---|---|
| Control Core | 100% ALpHACURE 955N | 66 | 40 | 70 | 105 |
| Test Core 1 | 95% ALpHACURE 955N + 5% Resorcinol | 75.5 | 49 | 77 | 128 |

As the results of Table 2B illustrate, the use of the modified ester-curative composition of the present invention in ester-cured alkaline phenolic no-bake binder systems has a limited effect on slow strip times and no significant effect on tensile strength of the systems, including the foundry molds and cores.

Example 3: Effect of Adding Resorcinol to an Ester Blend Comprised of Gamma Butyrolactone and Propylene Carbonate in an Ester-Cured Alkaline Phenolic No-Bake Binder Composition In this example, 5% (by weight) of resorcinol was dissolved in 95% (by weight) of an ester blend comprised of 70% (by weight) of gamma butyrolactone and 30% (by weight) of propylene carbonate. Samples and cores were made, as described above. The formaldehyde emissions measurements were made using EPA Method 316 and the results of the measurements are provided in Table 3A below.

TABLE 3A

Reduction of Formaldehyde Emission in Ester-Cured Alkaline Phenolic No-Bake Binder Composition Combining Blended Ester and Resorcinol

| Sample Number | Modified Ester-Curative Composition, wt % | Formaldehyde Emitted, ppm | Reduction, % |
|---|---|---|---|
| Control Sample | 70% gamma butyrolactone and 30% propylene carbonate | 4.149 | n/a |
| Test Sample 1 | 95% of (70% gamma butyrolactone + 30% propylene carbonate) + 5% Resorcinol | 2.127 | 48.7 |

As the results of Table 3A illustrate, the use of the modified ester-curative composition of the present invention in ester-cured alkaline phenolic no-bake binder systems results in unexpected and compelling reductions in formaldehyde emissions from the systems, including the foundry molds and cores.

Additionally, the tensile strength of the cores formed under Example 3 were tested using a Thwing-Albert Tensile Tester, as described above. The results of the tests are provided in Table 3B below.

TABLE 3B

Sustained Tensile Strength of Ester-Cured Alkaline Phenolic No-Bake Binder Composition Haying Reduced of Formaldehyde Emission and Combining Blended Ester and Resorcinol

| Core Number | Modified Ester-Curative Composition, wt % | "Fast" Strip Time, minutes | Tensile Strength at 1 Hour, psi | Tensile Strength at 2 Hours, psi |
|---|---|---|---|---|
| Control Core | 70% gamma butyrolactone and 30% propylene carbonate | 2.5 | 63 | 66 |
| Test Core 1 | 95% of (70% gamma butyrolactone + 30% propylene carbonate) + 5% Resorcinol | 2.8 | 69 | 79 |

As the results of Table 3B illustrate, the use of the modified ester-curative composition of the present invention in ester-cured alkaline phenolic no-bake binder systems has a limited effect on fast strip times and no significant effect on tensile strength of the systems, including the foundry molds and cores.

While the invention has been described with specific embodiments, many alternatives, modifications, and variations will be apparent to those skilled in the art in light of the foregoing description. Accordingly, the present invention is intended to include all such alternatives, modifications, and variations set forth within the spirit and scope of the appended claims.

What is claimed is:

1. A method for reducing formaldehyde emissions from ester-cured foundry binders used in the formation of foundry molds and cores, the method comprising the steps of:
    (a) combining an aggregate with a water soluble alkaline phenolic resole resin to form a first admixture;
    (b) combining an ester-curative with resorcinol to form a modified ester-curative; and
    (c) combining the first admixture with the modified ester-curative to form a second admixture;
    wherein the modified ester-curative is configured to affect a reduced emission of formaldehyde from the second admixture.

2. The method of claim 1, wherein the resin comprises about 5% to about 10% sodium hydroxide by weight of the resin.

3. The method of claim 1, wherein the ratio of ester-curative to resorcinol ranges from about 19:1 to about 99:1 by weight of the modified ester-curative.

4. The method of claim 3, wherein the resin comprises about 5% to about 10% sodium hydroxide by weight of the resin.

5. The method of claim 1, wherein the resin has a pH of approximately 13 or greater.

6. The method of claim 1, wherein the ester-curative comprises about 20% to about 30% glycerol triacetate by weight of the ester-curative.

7. The method of claim 6, wherein the ester-curative further comprises about 70% to about 80% dibasic ester by weight of the ester-curative.

8. The method of claim 6, wherein the ratio of ester-curative to resorcinol ranges from about 19:1 to about 99:1 by weight of the modified ester-curative.

9. The method of claim 8, wherein the ratio of ester-curative to resorcinol is about 19:1.

10. The method of claim 1, wherein the ester-curative comprises about 70% to about 80% dibasic ester by weight of the ester-curative.

11. The method of claim 10, wherein the ratio of ester-curative to resorcinol ranges from about 19:1 to about 99:1 by weight of the modified ester-curative.

12. The method of claim 11, wherein the ratio of ester-curative to resorcinol is about 19:1.

13. The method of claim 1, wherein the ester-curative comprises about 90% to about 100% glycerol triacetate by weight of the ester-curative.

14. The method of claim 13, wherein the ratio of ester-curative to resorcinol ranges from about 19:1 to about 99:1 by weight of the modified ester-curative.

15. The method of claim 14, wherein the ratio of ester-curative to resorcinol is about 32:1.

16. The method of claim 1, wherein the ester-curative comprises about 30% propylene carbonate by weight of the ester-curative and about 70% gamma butyrolactone by weight of the ester-curative.

17. The method of claim 16, wherein the ratio of ester-curative to resorcinol ranges from about 19:1 to about 99:1 by weight of the modified ester-curative.

18. The method of claim 17, wherein the ratio of ester-curative to resorcinol is about 19:1.

19. The method of claim 1, further comprising the steps of:
(d) placing the second admixture into a housing; and
(e) allowing the second admixture to cure;
wherein the ratio of ester-curative to resorcinol ranges from about 19:1 to about 99:1 by weight of the modified ester-curative; and
wherein the resin has a pH of approximately 13 or greater.

20. A method for reducing formaldehyde emissions from ester-cured foundry binders used in the formation of foundry molds and cores, the method comprising the steps of:
(a) combining an aggregate with a water soluble alkaline phenolic resole resin to form a first admixture;
(b) combining an ester-curative with resorcinol to form a modified ester-curative; and
(c) combining the first admixture with the modified ester-curative to form a second admixture;
wherein the resin comprises about 5% to about 10% sodium hydroxide by weight of the resin, and the resin has a pH of approximately 13 or greater;
wherein the ester curative-curative comprises about 20% to about 100% glycerol triacetate by weight of the ester-curative;
wherein the ratio of ester-curative to resorcinol ranges from about 19:1 to about 99:1 by weight of the modified ester-curative;
wherein the modified ester-curative is configured to affect a reduced emission of formaldehyde from the second admixture.

* * * * *